Nov. 20, 1962   H. C. WILDES   3,064,369
SNOW PLOW ATTACHMENT FOR LAWN MOWERS
Filed Jan. 20, 1960

INVENTOR
Howard C. Wildes
BY Robert M. Dunning
ATTORNEY 3,064,369
SNOW PLOW ATTACHMENT FOR LAWN MOWERS
Howard C. Wildes, 3052 22nd Ave. S.,
Minneapolis, Minn.
Filed Jan. 20, 1960, Ser. No. 3,579
6 Claims. (Cl. 37—43)

This invention relates to an improvement in snow plow attachment for lawn mowers and deals particularly with a simple and effective attachment for a rotary type lawn mower which may be used for removing snow from side walks and the like.

During recent years numerous types of snow plows have been produced for picking up snow from a flat surface such as a side walk and blowing the snow to one side of the surface to be cleared. Such snow plows are normally engine driven and accordingly are as expensive to build as a rotary lawn mower. As lawn mower are not usually used in weather when it is cold enough to snow, and as snow plows are not usually required when the weather is warm enough so that grass will grow, two pieces of equipment are usually required, both of which are relatively expensive, and one of which always remains idle while the other is being used.

The object of the present invention resides in the provision of a combination snow blower and lawn mower which are driven by the same power unit. The apparatus may be converted from a lawn mower to a snow plow by merely removing the grass cutting blade, substituting a different form of blade for the cutting blade, and attaching a partition plate and snow connecting member to the under surface of the lawn mower body. As a result, the lawn mower can be converted to a snow blower in a very few minutes time.

A feature of the present invention resides in the provision of a snow blower which acts to some extent in the manner of a vacuum cleaner. The snow is directed beneath the body of the mower by suitable deflecting blades. When centrally located beneath the mower body, the snow is lifted upwardly through a base plate or partition plate by the fan blade which is mounted upon the motor shaft and the snow is blown through the outlet of the mower housing and directed laterally of the direction of travel of the device.

A feature of the present invention resides in the provision of a device of the class described having snow guiding blades which extend in diverging relation from beneath the housing of the apparatus and which rest upon the surface of the side walk or driveway. These blades thus conform to the surface, actually riding along the surface to be cleaned and raising and lowering to accommodate irregularities in the surface.

A further feature of the present invention resides in the provision of an apparatus of the type described having a generally V-shaped snow directing guide connected to the housing of the apparatus to ride over the surface to be cleaned and fixed overlapping members on the under surface of the housing which assist in preventing snow from passing over the floating blades.

These and other objects and novel features of the present invention will be more clearly and fully set forth in the following specification and claims.

In the drawings forming a part of the specification.

Figure 1:
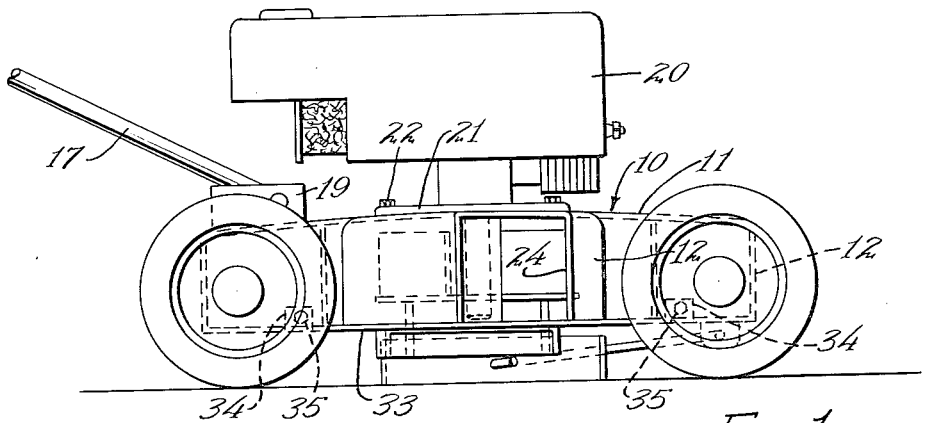
FIGURE 1 is a side elevational view of the combination rotary mower and the snow plow showing the general arrangement of parts thereof.
Figure 2:
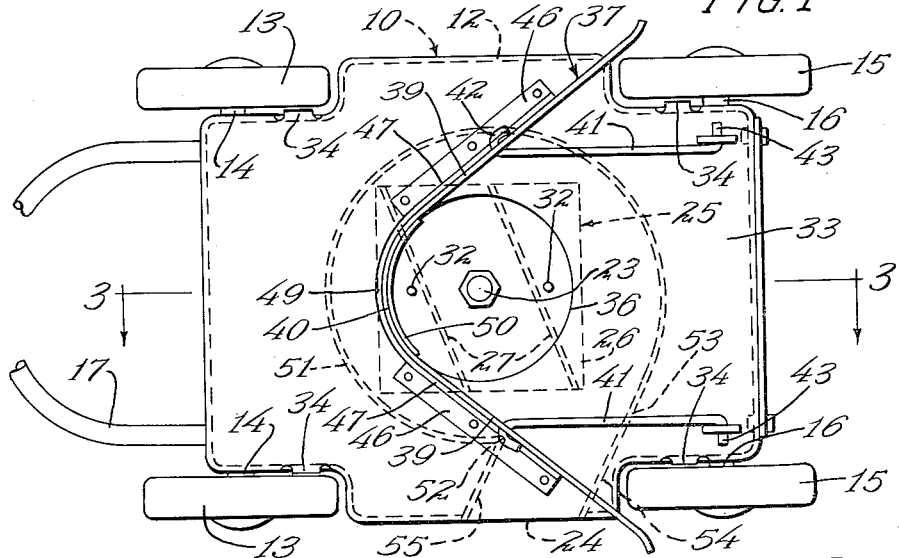
FIGURE 2 is a bottom plan view of the apparatus illustrated in FIGURE 1.
Figure 3:
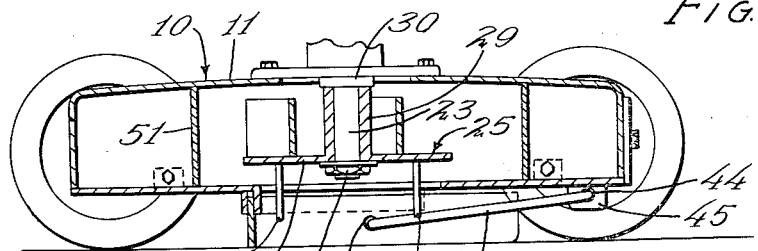
FIGURE 3 is a vertical sectional view through the housing of the apparatus, the position of the section being indicated by the line 3—3 of FIGURE 2.

The body of the apparatus is that of a conventional rotary lawn mower, the device including a housing 10 having a top panel 11 and encircling downwardly extending peripheral walls 12. The housing 10 is supported by rear wheels 13 mounted on shafts 14 which may be aligned or may be offset one from another. The front of the apparatus is supported by front wheels 15 mounted upon pivot shafts 16 which may also be aligned or offset. A handle 17 is pivotally connected to the housing 10 by brackets 19 or other suitable means.

A gasolene engine 20 or other suitable drive means is mounted upon a mounting flange 21 secured by bolts 22 or other suitable means to the top panel 11 of the housing. The motor 20 is provided with a drive shaft 23 which extends downwardly through the top 11 of the housing. It is this shaft 23 which normally supports the rotating blade of the lawn mower when the apparatus is used for cutting grass. One side of the side wall 12 is provided with a discharge opening 24 through which grass is directed when the device is used as a lawn mower and through which snow is forced when the apparatus is used as a snow plow.

A fan element 25 is mounted on shaft 23 in place of the mower cutting blade when the apparatus is converted. In the particular arrangement illustrated, the fan element 25 includes a rectangular base plate 26 having a pair of diagonally extending rectangular blades 27 extending upwardly therefrom on opposite sides of the center of the plate. At the center, the plate 26 is provided with an upwardly projecting sleeve 29 which is designed to accommodate the end of the drive shaft 23. The sleeve 29 may be keyed to the drive shaft 23 or clamped between an enlarged portion 30 of the drive shaft and a clamping nut 31 at the lower end of the shaft. A pair of diametrically opposed fingers 32 project downwardly from the under surface of the plate 26.

A bottom closure panel or partition plate 33 is secured to the under surface of the housing 10 to form a bottom closure therefor. In the present arrangement, the closure plate 33 is provided with upwardly projecting lugs 34 at points spaced about the periphery of the plate, these lugs 34 extending upwardly along the side wall 12 of the housing 10. Fastening bolts such as 35 extend through the lugs 34 and into the side wall 12 to firmly secure the closure plate 33 to the housing 10. The plate 33 is provided with an intake aperture 36 extending therethrough in coaxial relation with the shaft 23. The fingers 32 extend downwardly through this aperture 36 and are designed to extend into the snow to keep the snow from caking together.

A snow collecting element 37 is supported beneath the bottom closure plate 33 and in preferred form includes a pair of outwardly diverging blades 39 arranged in V-shaped form and connected by a rounded connecting portion 40. A pair of links 41 are provided with hook ends 42 which extend through suitable apertures 48 in the blades 39 thus pivotally connecting the links to the blades. The links 41 are also provided with laterally turned ends 43 which extend through apertures 44 in a pair of lugs 45 projecting downwardly from the plate 33. As a result, the snow collecting unit rides along the surface of the walk or driveway being cleaned and may raise or lower to accommodate for irregularities in the surface.

A pair of angles 46 are secured to the under surface of the plate 33 and include downwardly projecting flanges 47 which extend in overlapping relation with the upper portions of the blade 39. The flanges 47 may be connected by a curve connecting portion 49 if it is so desired. A curved baffle 50 extends downwardly from the bottom plate 33 susbtantially along the edge of the aperture 36 to act as a further baffle to prevent snow from passing over the upper edge of the snow collecting member 37.

The operation of the apparatus is believed obvious. When the engine 20 is started and the apparatus moved over the surface to be cleared of snow, the snow is collected by the member 37 and directed toward the center of the housing, beneath the aperture 36. The fan 25 acts as a suction fan to lift the snow upwardly through the opening 36 and to blow it laterally through the outlet 24. While the fan described has been found very effective for its purpose, other types of fans which are capable of producing partial vacuum may be used in place of the one described.

In order to increase the efficiency of the fan, I preferably provide a generally spiral wall 51 on the upper surface of the plate 33 which forms a volute or chamber of gradually increasing size from the point of greatest restriction 52 to the widest part 53 from which the wall extends tangentially to the outlet as indicated at 54. The wall also includes a generally parallel wall portion 55 which extends from the point 52 of greatest restriction to the outlet 24.

In accordance with the patent statutes, I have described the principles of construction and operation of my improvement in snow plow attachment for lawn mowers, and while I have endeavored to set forth the best embodiment thereof, I desire to have it understood that changes may be made within the scope of the following claims without departing from the spirit of my invention.

I claim:

1. A snow blowing attachment for a rotary lawn mower having a housing including a top panel and downwardly extending peripheral walls, the walls defining an outlet passage, a power unit on said housing and including a drive shaft extending downwardly into the housing and wheels supporting said housing at an elevation above ground level, the attachment including a bottom closure plate secured to said housing within said housing and including an opening therethrough coaxial with said drive shaft, and a suction fan having a base plate at an elevation above that of said closure plate, said base plate carrying a plurality of upwardly projecting blades on its upper face and a plurality of downwardly projecting fingers on its lower face.

2. A snow blowing attachment for a rotary lawn mower having a housing including a top panel and downwardly extending peripheral walls, the walls defining an outlet passage, a power unit on said housing and including a drive shaft extending downwardly into the housing and wheels supporting the lower edge of said housing at a substantial distance above the ground, the attachment including a bottom closure plate secured to said peripheral walls adjacent their lower edges and including an opening therethrough coaxial with said drive shaft, a suction fan mounted on said shaft and operable to draw air through said opening and out through the outlet passage, and snow collecting means pivotally supported beneath said bottom closure plate for directing snow beneath said opening.

3. A snow blowing attachment for a rotary lawn mower having a housing including a top panel and downwardly extending peripheral walls, the walls defining an outlet passage, a power unit on said housing and including a drive shaft extending downwardly into the housing and wheels supporting the lower edges of said housing at a substantial distance above the ground, the attachment including a bottom closure plate secured to said peripheral walls adjacent their lower edges and including an opening therethrough coaxial with said drive shaft, a suction fan mounted on said shaft and operable to draw air through said opening and out through the outlet passage, and a generally V-shaped snow collecting member connected to said housing and supported for upward and downward movement relative to said bottom closure plate.

4. A snow blowing attachment for a rotary lawn mower having a housing including a top panel and downwardly extending peripheral walls, the walls defining an outlet passage, a power unit on said housing and including a drive shaft extending downwardly into the housing and wheels supporting the lower edges of said housing at a substantial distance above the ground, the attachment including a bottom closure plate secured to said peripheral walls adjacent their lower edges and including an opening therethrough coaxial with said drive shaft, a suction fan mounted on said shaft and operable to draw air through said opening and out through the outlet passage, said suction fan including a bottom plate above said closure plate and means midway between said blades and centrally of said bottom plate for securing said blades to said shaft, and a pair of diametrically opposed fingers extending downwardly from said bottom plate on opposite sides of the center thereof.

5. A snow blowing attachment for a rotary lawn mower having a housing including a top panel and downwardly extending peripheral walls, the walls defining an outlet passage, a power unit on said housing and including a drive shaft extending downwardly into the housing and wheels supporting the lower edges of said housing at a substantial distance above the ground, the attachment including a bottom closure plate secured to said peripheral walls adjacent their lower edges and including an opening therethrough coaxial with said drive shaft, a suction fan mounted on said shaft and operable to draw air through said opening and out through the outlet passage, and a wall inwardly of said peripheral walls encircling said suction fan and providing a volute therefor.

6. A snow blowing attachment for a rotary lawn mower having a housing including a top panel and downwardly extending peripheral walls, the walls defining an outlet passage, a power unit on said housing and including a drive shaft extending downwardly into the housing and wheels supporting the lower edges of said housing at a substantial distance above the ground, the attachment including a bottom closure plate secured to said peripheral walls adjacent their lower edges and including an opening therethrough coaxial with said drive shaft, a suction fan mounted on said shaft and operable to draw air through said opening and out through the outlet passage, said suction fan including a disc of larger diameter than said opening and spaced above the opening, and blade means extending upwardly from the upper surface thereof.

References Cited in the file of this patent

UNITED STATES PATENTS

| | | |
|---|---|---|
| 2,752,699 | Gustafson | July 3, 1956 |
| 2,809,389 | Collins et al. | Oct. 15, 1957 |
| 2,823,508 | Brown | Feb. 18, 1958 |
| 2,882,668 | Murillo | Apr. 21, 1959 |
| 2,930,068 | Evanson et al. | Mar. 29, 1960 |